US010674652B2

(12) United States Patent
Ricketts et al.

(10) Patent No.: US 10,674,652 B2
(45) Date of Patent: Jun. 9, 2020

(54) HARVESTER WITH ADJUSTABLE ROW DIVIDERS

(71) Applicant: CNH Industrial America LLC, New Holland, PA (US)

(72) Inventors: Jonathan Ricketts, Coal Valley, IL (US); Brett Gutknecht, Cedar Falls, IA (US); Nate McGraw, Macomb, IL (US); Adam Hession, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 196 days.

(21) Appl. No.: 15/882,438

(22) Filed: Jan. 29, 2018

(65) Prior Publication Data

US 2019/0230843 A1    Aug. 1, 2019

(51) Int. Cl.
*A01B 63/02*    (2006.01)
*A01D 63/04*    (2006.01)
*A01D 45/02*    (2006.01)

(52) U.S. Cl.
CPC ............ *A01B 63/023* (2013.01); *A01D 63/04* (2013.01); *A01D 45/021* (2013.01)

(58) Field of Classification Search
CPC ... B62D 1/28; B62D 6/002; B60W 2300/158; B60W 2300/15; G05D 2201/0201; A01B 69/007; A01B 69/008; A01B 69/003; A01B 63/023; A01D 45/021; A01D 41/1278; A01D 63/04
See application file for complete search history.

(56) References Cited

U.S. PATENT DOCUMENTS

| | | | | |
|---|---|---|---|---|
| 3,680,648 A | * | 8/1972 | Tonsfeldt | A01B 39/00 172/159 |
| 3,812,661 A | | 5/1974 | Baker | |
| 4,219,992 A | * | 9/1980 | Henry, Sr. | A01D 75/02 123/273 |
| RE31,063 E | * | 10/1982 | Greiner | A01D 45/021 56/119 |

(Continued)

FOREIGN PATENT DOCUMENTS

DE          1025663       3/1958
DE     102006027343 A1   12/2007
(Continued)

OTHER PUBLICATIONS

Extended European Search Report for EP Application No. 19154130.9 dated Jun. 7, 2019 (five pages).

*Primary Examiner* — Arpad Fabian-Kovacs
(74) *Attorney, Agent, or Firm* — Peter Zacharias; Patrick Sheldrake

(57) ABSTRACT

A harvester and associated method for adjusting a first row divider and a second row divider of the harvester, the first row divider having a first adjustable divider tip defining a first divider angle relative to a travel axis of the harvester and the second row divider having a second adjustable divider tip defining a second divider angle relative to the travel axis. The method includes detecting a turn of the harvester and activating at least one actuator to adjust the first divider angle by a first amount and the second divider angle by a second amount that is different from the first amount responsively to the detecting the turn.

17 Claims, 6 Drawing Sheets

(56) References Cited

U.S. PATENT DOCUMENTS

| | | | |
|---|---|---|---|
| 4,528,804 A * | 7/1985 | Williams | A01B 69/008 |
| | | | 180/401 |
| 4,538,404 A * | 9/1985 | Heimark, Jr. | A01D 45/021 |
| | | | 56/119 |
| 6,745,550 B1 | 6/2004 | Hinds et al. | |
| 6,799,105 B2 * | 9/2004 | Stout | B62D 6/002 |
| | | | 180/421 |
| 7,054,731 B1 * | 5/2006 | Lange | A01B 69/008 |
| | | | 172/4.5 |
| 7,073,316 B2 | 7/2006 | Resing et al. | |
| 7,350,345 B2 * | 4/2008 | Slabbinck | A01D 63/00 |
| | | | 56/119 |
| 7,543,674 B2 | 6/2009 | Rauch | |
| 7,555,884 B2 | 7/2009 | Janning | |
| 8,387,998 B2 | 3/2013 | Hinds | |
| 9,320,197 B2 | 4/2016 | Peters et al. | |
| 2002/0035826 A1 * | 3/2002 | Albinger | A01D 41/144 |
| | | | 56/109 |
| 2002/0106108 A1 * | 8/2002 | Benson | A01B 69/001 |
| | | | 382/104 |
| 2003/0226342 A1 * | 12/2003 | Boeckmann | A01D 41/144 |
| | | | 56/14.7 |
| 2004/0244352 A1 * | 12/2004 | Weichholdt | A01D 63/04 |
| | | | 56/314 |
| 2006/0282205 A1 * | 12/2006 | Lange | A01B 69/008 |
| | | | 701/50 |
| 2009/0025354 A1 * | 1/2009 | Guldenpfennig | A01D 45/021 |
| | | | 56/119 |

FOREIGN PATENT DOCUMENTS

| | | | |
|---|---|---|---|
| EP | 1378160 | A1 | 1/2004 |
| EP | 1397951 | A2 | 3/2004 |

* cited by examiner

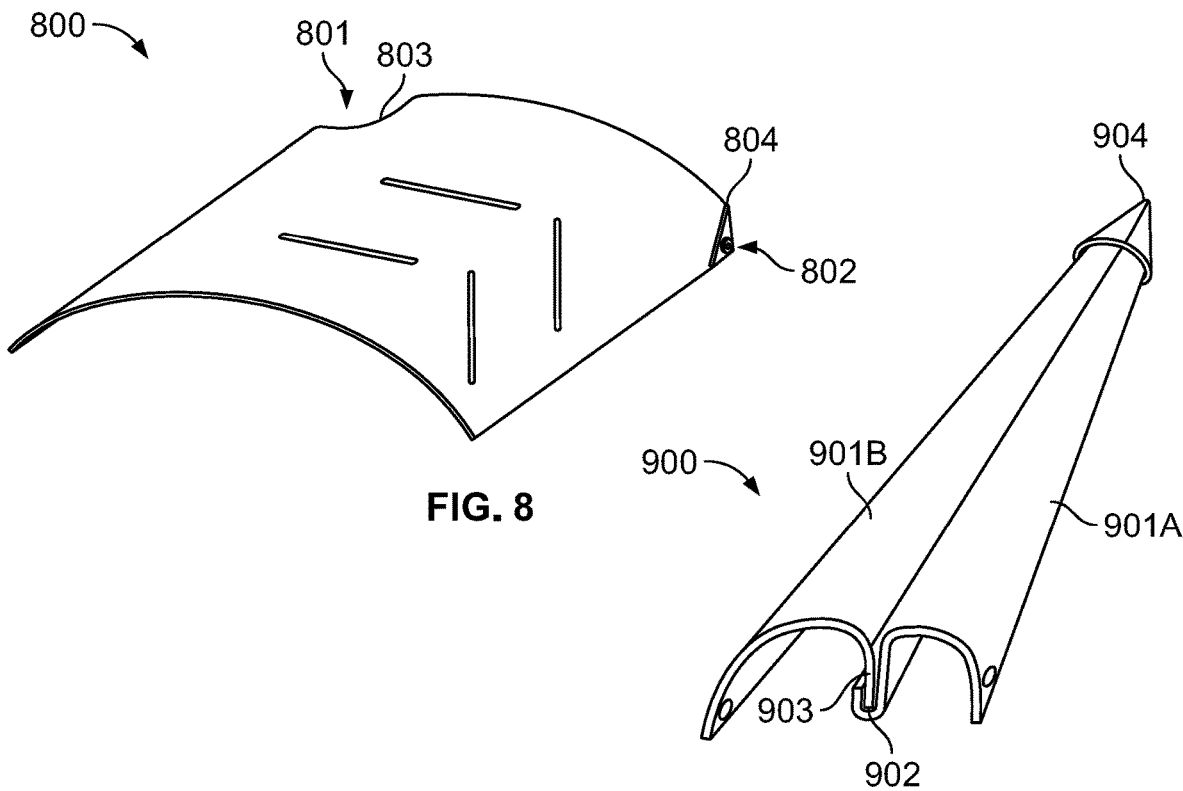
FIG. 8
FIG. 9
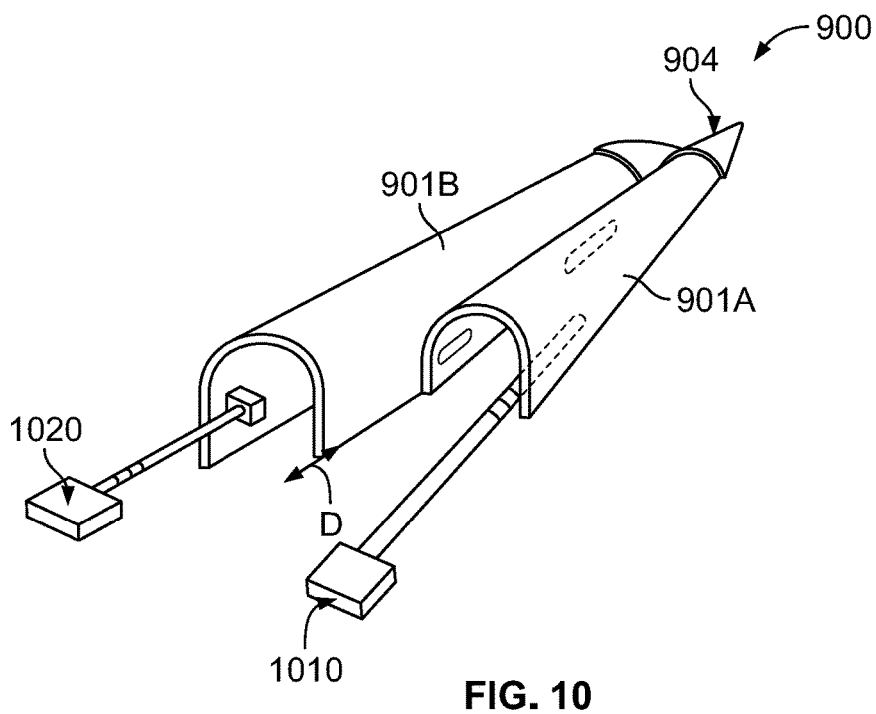
FIG. 10

HARVESTER WITH ADJUSTABLE ROW DIVIDERS

BACKGROUND

Harvesters such as combine harvesters, windrowers, tractors, and forage harvesters, are equipped with headers to harvest crops in a field. A typical header includes a header frame carrying one or more harvesting elements, such as snap rolls or cutter bars, that engage the crops to separate the crop material from the field for collection by the harvester. The header also typically includes some type of conveying mechanism, such as a pair of rotating augers or belts, that will convey collected crop material toward a center of the header and rearwardly into the harvester for further processing and/or transport. For some types of harvesters, such as combine harvesters, various specific header constructions are known for harvesting specific crops, e.g., corn headers for harvesting corn, wheat headers for harvesting wheat, etc.

Many header constructions include multiple row dividers to direct rowed crops toward the harvesting element(s) and maintain the rows during harvesting. The row dividers help ensure the harvesting element(s) properly engages the standing crops as the harvester travels through the field to remove crop material from the field. One particular issue that can arise during harvesting if one or more of the row dividers is not properly aligned relative to the crop rows is the divider(s) can run over and flatten standing crops, which then cannot be collected by the harvester and will be considered lost crop.

SUMMARY

The present disclosure relates to a harvester with a header having row dividers each defining a respective divider angle that can be adjusted differently from other divider angles during turning of the harvester.

In some exemplary embodiments disclosed herein, a harvester includes: a chassis defining a travel axis; at least one steerable wheel carried by the chassis; a turn angle sensor associated with the at least one steerable wheel and configured to output a turn angle signal; a header carried by the chassis and including: a header frame; a first row divider carried by the header frame and having a first adjustable divider tip, the first adjustable divider tip defining a first divider angle relative to the travel axis; a second row divider carried by the header frame and having a second adjustable divider tip, the second adjustable divider tip defining a second divider angle relative to the travel axis; and at least one divider actuator coupled to the first row divider and the second row divider and configured to adjust the first divider angle and the second divider angle; and a controller operatively coupled to the turn angle sensor and the at least one divider actuator. The controller is configured to: detect the at least one steerable wheel is making a turn; activate the at least one actuator to adjust the first divider angle by a first amount responsively to the detecting the turn; and activate the at least one actuator to adjust the second divider angle by a second amount that is different from the first amount responsively to the detecting the turn.

In some exemplary embodiments disclosed herein, a method for adjusting a first row divider and a second row divider of a harvester is provided. The first row divider has a first adjustable divider tip defining a first divider angle relative to a travel axis of the harvester and the second row divider has a second adjustable divider tip defining a second divider angle relative to the travel axis. The method includes detecting a turn of the harvester and activating at least one actuator to adjust the first divider angle by a first amount and the second divider angle by a second amount that is different from the first amount responsively to the detecting the turn.

One possible benefit that may be realized by exemplary embodiments disclosed herein is the respective divider angle of each divider can be adjusted based on the location of the divider relative to a reference point, such as a center, of the harvester frame.

Another possible benefit that may be realized by exemplary embodiments disclosed herein is adjusting the divider angles differently from one another can reduce the number of standing crops that are flattened, and therefore lost, as the harvester turns.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester and header, reference is made to the accompanying figures, wherein:

FIG. 8 is a perspective view of an exemplary embodiment of a hood to accommodate the row divider shown in FIG. 7;

FIG. 9 is a perspective view of yet another exemplary embodiment of a row divider body with an adjustable divider tip in an operating orientation;

FIG. 10 is a perspective view of the row divider shown in FIG. 9 with displaced segments.

DETAILED DESCRIPTION

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is a combine harvester, a windrower, or a forage harvester. In some embodiments, the harvester is a combine harvester.

The term "material" as used herein is defined as a numerous individual items that are harvested or collected by the harvester. In some embodiments, the material is agricultural crop, such as corn or wheat.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Figure 1:
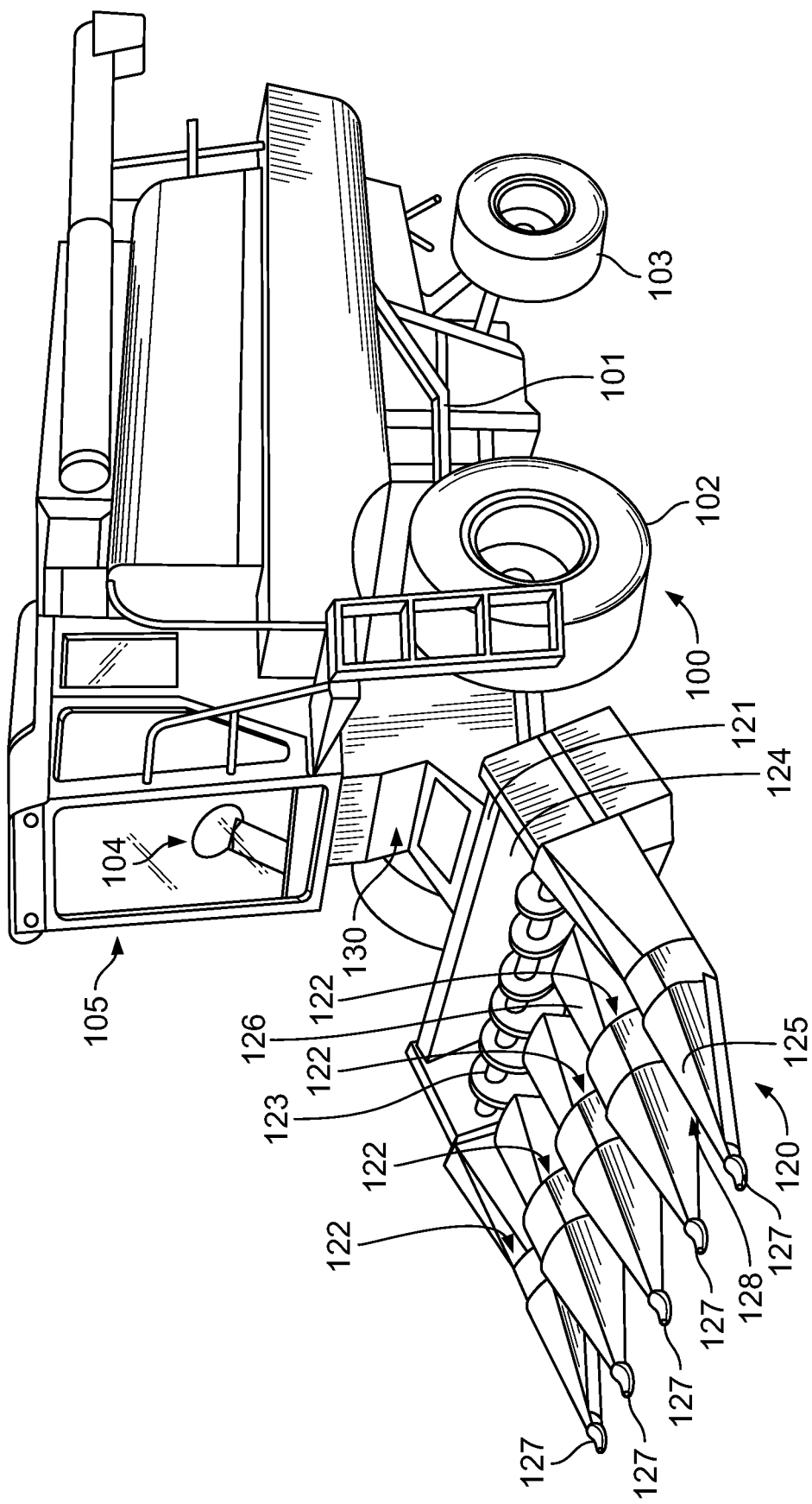
FIG. 1 is a perspective view of a known harvester equipped with a corn header.

Referring now to the drawings, and more particularly to FIG. 1, a known harvester 100, which may be referred to as a "combine" or "combine harvester," is shown. The harvester 100 includes a chassis 101 and a plurality of ground-engaging wheels 102, 103 carried by the chassis 101. The front wheels 102 can be, in some exemplary embodiments, larger, flotation-type wheels and the rear wheels 103 can be, in some exemplary embodiments, smaller, steerable wheels. Motive force can be selectively applied to the front wheels 102 through a power plant (not shown), which in some exemplary embodiments may be a diesel engine. The rear steerable wheels 103 can be controlled by a steering mechanism 104, such as a steering wheel, in a cabin 105 of the harvester 100 that an operator utilizes to turn the harvester 100.

The harvester 100 includes a header 120 carried by the chassis 101. As shown, the header 120 is configured as a corn header for harvesting corn and is cantilevered in the front of the combine 100 and connected to the combine 100 by a feeder housing 130. It should be appreciated that while the header 120 shown herein is configured to harvest corn, the present disclosure is also applicable to other header constructions such as, for example, headers configured to harvest wheat or other crops.

The illustrated header 120 includes a header frame 121 carrying four row units 122, which harvest four rows of corn simultaneously. In other exemplary embodiments, the number of row units 122 may be different than four, for example greater than four or less than four. Ears of corn are stripped from each of the four rows by the header 120 and then carried by a conveyor 123, such as an auger, in a trough 124 to the feeder housing 130. Feeder housing 130 carries the collected ears rearwardly and upwardly into a threshing assembly (not shown) in the body of combine 100. Each of the row units 122 has an associated row divider 125 and a hood 126, as is known, and may include one or more harvesting elements 128, such as a pair of deck plates or a cutter bar, for removing standing crops from the field.

The row dividers 125 of the row units 122 are shown in a first operating orientation where a tip 127 of each row divider 125 is generally parallel to the tips 127 of other row dividers 125. When the harvester 100 is traveling through crop rows in a straight line, the tips 127 all being in parallel assists in properly directing the standing crops, which will also be generally parallel to one another if properly rowed, toward the harvesting elements 128 to cut the crops in the rows, as is known.

Figure 2:
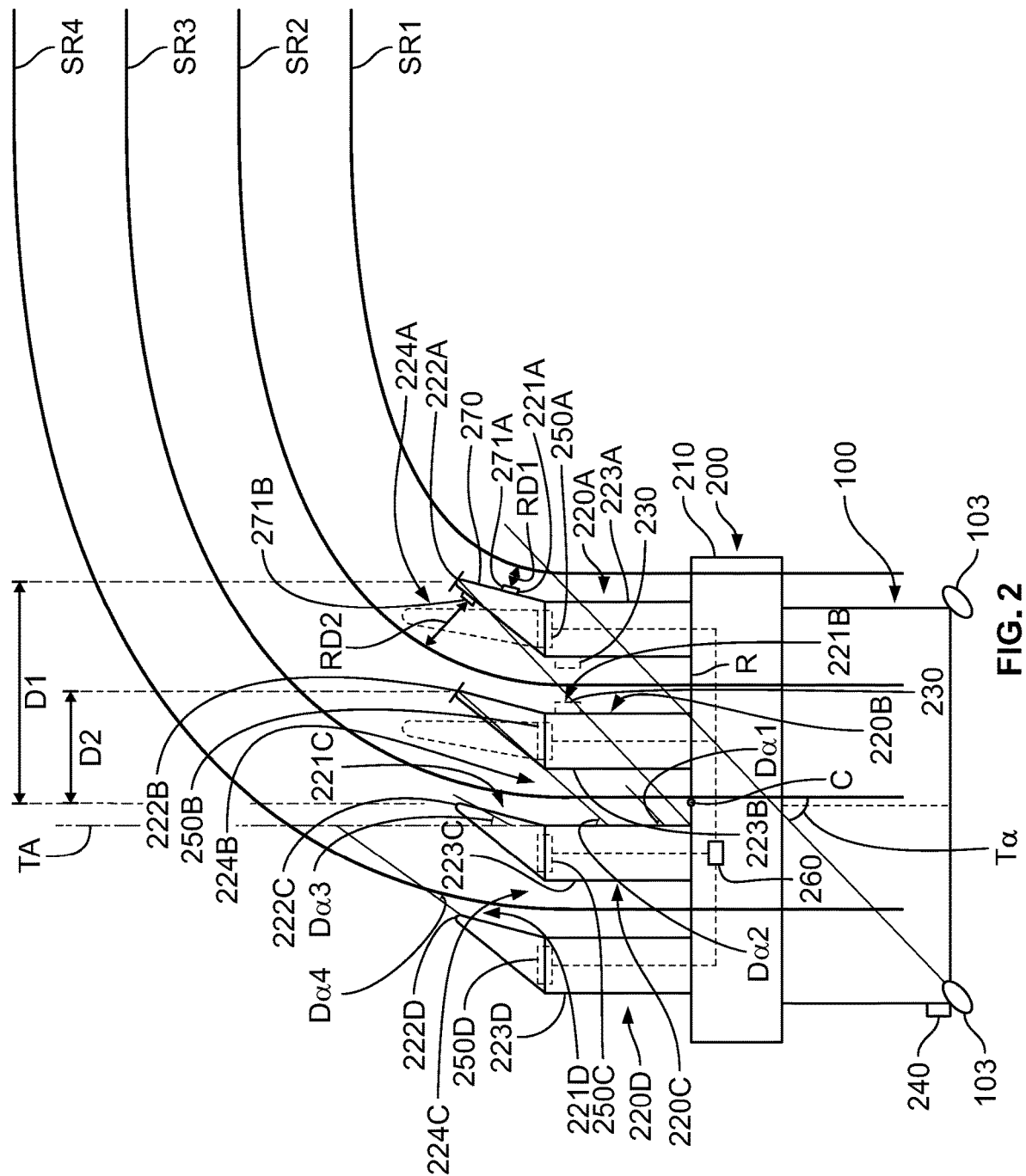
FIG. 2 is a top view of an exemplary embodiment of a harvester making a turn through a field with standing crop rows.

Referring now to FIG. 2, an exemplary embodiment of a header 200 that can be included in the harvester 100 is shown that includes a header frame 210 carrying a plurality of row units 220A, 220B, 220C, 220D each including a respective row divider 221A, 221B, 221C, 221D. Each of the row dividers 221A, 221B, 221C, 221D has a respective adjustable divider tip 222A, 222B, 222C, 222D that, generally, will be the leading portion of the row dividers 221A, 221B, 221C, 221D as the harvester 100 travels. Each of the row dividers 221A, 221B, 221C, 221D can be connected to a respective hood 223A, 223B, 223C, 223D, which will be described further herein.

As can be seen in FIG. 2, the chassis 110 defines a travel axis TA that the harvester 100 generally travels along, as is known. Each of the divider tips 222A, 222B, 222C, 222D defines a respective divider angle $D\alpha1$, $D\alpha2$, $D\alpha3$, $D\alpha4$ relative to the travel axis TA to define crop entryways 224A, 224B, 224C between adjacent row dividers 221A, 221B, 221C, 221D. The respective divider angles $D\alpha1$, $D\alpha2$, $D\alpha3$, $D\alpha4$ of the row dividers 221A, 221B, 221C, 221D control the shape of the crop entryways 224A, 224B, 224C to control how standing crops are directed toward one or more harvesting elements 230 carried by the header frame 210.

The harvester 100 is shown in FIG. 2 making a turn by turning the steerable wheels 103 to navigate through standing rows SR1, SR2, SR3, SR4 of crops. As the harvester 100 turns, a center C of the header frame 210 tends to follow a turn radius R of the harvester 100 corresponding to a turn angle $T\alpha$ of the steerable wheels 103 relative to the travel axis TA.

The harvester 100 includes a turn angle sensor 240 associated with at least one of the steerable wheels 103 that is configured to output a turn angle signal that indicates the turn angle $T\alpha$. In some exemplary embodiments, the turn angle sensor 240 may be directly coupled to one or more of the steerable wheels 103 to directly determine the turn angle $T\alpha$ from the orientation of the steerable wheel(s) 103, as is known. In some exemplary embodiments, the turn angle sensor 240 may be coupled with the steering mechanism 104 to indirectly determine the turn angle $T\alpha$ from the orientation of the steering mechanism 104, which controls the steerable wheel(s) 103 as is known. Many different types of angle sensors are known, and any configuration of the turn angle sensor 240 may be used so long as the turn angle sensor 240 is able to directly or indirectly measure the turn angle $T\alpha$ of the steerable wheel(s) 103 as the harvester 100 makes a turn and output a turn angle signal indicative of the turn angle $T\alpha$.

Due to the location of each row divider 221A, 221B, 221C, 221D and its associated divider tip 222A, 222B, 222C, 222D being different relative to a reference point defined by the header frame 210, such as the previously described center C, each of the divider tips 222A, 222B, 222C, 222D will define a respective turning arc that is different from the turning arcs of the other divider tips 222A, 222B, 222C, 222D. When the standing rows SR1, SR2, SR3, SR4 of crop material have one or more sections that are not parallel with the turning arcs of the divider tips 222A, 222B, 222C, 222D, which is often the case, the row dividers 221A, 221B, 221C, 221D will tend to run over at least some of the crops in the standing rows SR1, SR2, SR3, SR4 that cannot then be collected by the harvester 100. This loss of crops may be especially pronounced when the harvester 100 is fully or partially autonomous and there is no user intervention to compensate for the turning arcs and standing rows SR1, SR2, SR3, SR4 being non-parallel.

To compensate for the different turning arcs of the row dividers 221A, 221B, 221C, 221D, two or more of the row dividers 221A, 221B, 221C, 221D are coupled to one or more divider actuators 250A, 250B, 250C, 250D to adjust the divider tips 222A, 222B, 222C, 222D and respective divider angles $D\alpha 1$, $D\alpha 2$, $D\alpha 3$, $D\alpha 4$, as will be described further herein. While each row divider 221A, 221B, 221C, 221D is shown with a respectively coupled divider actuator 250A, 250B, 250C, 250D, it should be appreciated that one, two, or three divider actuators can be utilized to adjust all of the divider angles $D\alpha 1$, $D\alpha 2$, $D\alpha 3$, $D\alpha 4$, as will be described further herein. The divider actuator(s) 250A, 250B, 250C, 250D may be any type of selectively activated actuator suitable to adjust the divider angles $D\alpha 1$, $D\alpha 2$, $D\alpha 3$, $D\alpha 4$, such as a pneumatic, hydraulic, or electric actuator.

The harvester 100 further includes a controller 260 operatively coupled to the actuator(s) 250A, 250B, 250C, 250D and the turn angle sensor 240. The controller 260 is configured to detect the steerable wheel(s) 103, and thus the harvester 100, is making a turn. The controller 260 may detect the steerable wheel(s) 103 is making a turn by, for example, receiving the turn angle signal from the turn angle sensor 240 during the turn. In some exemplary embodiments, the controller 260 may constantly receive the turn angle signal from the turn angle sensor 240 and detect the harvester 100 is turning when the turn angle signal changes. In some exemplary embodiments, the controller 260 only receives the turn angle signal when the steerable wheel(s) 103 is in the process of turning or about to begin turning.

Upon detecting the steering wheel(s) 103 is making a turn, the controller 260 activates one or more of the actuators 250A, 250B, 250C, 250D. For ease of description, the controller 260 is described further herein as activating a "first actuator" 250A coupled to a "first row divider" 221A with a "first adjustable divider tip" 222A and a "second actuator" 250B coupled to a "second row divider" 221B with a "second adjustable divider tip" 222B, but it should be appreciated that the controller 260 may only activate one of the actuators 250A, 250B, 250C, 250D responsively to detecting the steering wheel(s) 103 is making the turn. In some exemplary embodiments, the controller 260 activates two or more of the actuators 250A, 250B, 250C, 250D simultaneously in response to detecting the steering wheel(s) 103 is making the turn or, in some exemplary embodiments, the controller 260 staggers activating the two or more actuators 250A, 250B, 250C, 250D in response to detecting the steering wheel(s) 103 is making the turn so the actuators 250A, 250B, 250C, 250D activate at different times.

The controller 260 activating the first actuator 250A, responsively to detecting the turn, adjusts the first divider angle $D\alpha 1$ by a first amount. When the first adjustable divider tip 222A is in the first predetermined operating orientation, which is illustrated in dashed lines in FIG. 2, the first adjustable divider tip 222A can be parallel to the travel axis TA and form an angle of 0° relative to the travel axis TA. Thus, the first amount by which the first actuator 250A adjusts the first divider angle $D\alpha 1$ may, in some exemplary embodiments, be equal to the magnitude of the first divider angle $D\alpha 1$ relative to the travel axis TA. In some exemplary embodiments, the first actuator 250A may adjust the first divider angle $D\alpha 1$ by a first amount between 10° and 35°, but it should be appreciated that these values are exemplary only.

Similarly, the controller 260 activating the second actuator 250B, responsively to detecting the turn, adjusts the second divider angle $D\alpha 2$ by a second amount. When the second adjustable divider tip 222B is in the second predetermined operating orientation, which is illustrated in dashed lines in FIG. 2, the second adjustable divider tip 222B can be parallel to the travel axis TA and form an angle of 0° relative to the travel axis TA. Thus, the second amount by which the second actuator 250B adjusts the second divider angle $D\alpha 2$ may, in some exemplary embodiments, be equal to the magnitude of the second divider angle $D\alpha 2$ relative to the travel axis TA. When in the second predetermined operating orientation, the second adjustable divider tip 222B may also be parallel to the first adjustable divider tip 222A in the first predetermined operating orientation. In some exemplary embodiments, the second actuator 250B may adjust the second divider angle $D\alpha 2$ by a second amount between 10° and 35°, but it should be appreciated that these values are exemplary only.

As can be seen in FIG. 2, the first row divider 221A may be an outer row divider, relative to the center C of the header frame 210 compared to the second row divider 221B located closer to the center C. In other words, the first adjustable divider tip 222A of the first row divider 221A defines a first distance D1 from the reference point (center) C of the header frame 210 while the second adjustable divider tip 222B of the second row divider 221B defines a second distance D2 from the reference point C that is less than the first distance D1. Because the first adjustable divider tip 222A is located a further distance from the center C of the header frame 210 than the second adjustable divider tip 222B, the first divider 221A may require greater divider angle adjustment than the second divider 221B to avoid running over adjacent standing rows, such as standing row SR2. Thus, the controller 260 is configured to activate the second actuator 250B to adjust the second divider angle $D\alpha 2$ by a second amount that is different from the first amount of adjustment for the first divider angle $D\alpha 1$, and vice versa. In some exemplary embodiments, the first amount of adjustment is greater than the second amount of adjustment due to the first distance D1 being greater than the second distance D2, which warrants a greater divider angle adjustment to avoid knocking down crops during the turn.

In some exemplary embodiments, the controller 260 is configured to base the first amount and second amount on the turn angle $T\alpha$, as measured by the turn angle sensor 240. For example, the controller 260 may be configured to activate the first actuator 250A to maintain a first ratio between the turn angle $T\alpha$ and the first amount and activate the second actuator 250B to maintain a second ratio between the turn angle $T\alpha$ and the second amount. By activating the actuators 250A, 250B to maintain the respective first and second ratios during the turn, the controller 260 can compensate for the different turning arcs of the row dividers 221A, 221B regardless of the turn angle $T\alpha$. The first ratio and second ratio may vary based on a number of vehicle parameters, including but not limited to a wheel base of the harvester 100, a length of the header 200, or a length of the adjustable divider tips 222A, 222B, 222C, 222D. It should therefore be appreciated that many different values for the first ratio and second ratio may be utilized, depending on the configuration of the harvester 100.

In some exemplary embodiments, one or more of the row dividers 221A, 221B, 221C, 221D, such as row divider 221A, may be equipped with a centering sensor system 270 including one or more distance sensors 271A, 271B operatively coupled to the controller 260 to keep the row divider 221A centered between standing rows SR1 and SR2 during the turn. For example, the distance sensors 271A, 271B may be optical sensors disposed on opposite lateral sides of the row divider 221A. The distance sensor 271A may, for example, detect a first row distance RD1 of the first row divider 221A from the standing row SR1 and the distance sensor 271B may detect a second row distance RD2 of the first row divider 221A from the standing row SR2. The controller 260 may be further configured to receive distance signals from each of the distance sensors 271A, 271B to determine if the first row divider 221A is centered or not. In some exemplary embodiments, if the controller 260 determines the measured distances RD1, RD2 are not equal, indicating the first row divider 221A is not centered, the controller 260 activates the first actuator 250A to adjust the first row 221A until the first row divider 221A is equidistant from both standing rows SR1 and SR2, i.e., centered between the standing rows SR1 and SR2. While the centering sensor system 270 is only shown being associated with the first row divider 221A, it should be appreciated that each of the row dividers 221A, 221B, 221C, 221D may incorporate a respective centering sensor system 270. Further, the centering sensor system 270 described herein may be used as a complement or alternative to other previously described functions of the controller 260 to adjust the respective divider angles Dα1, Dα2, Dα3, Dα4 of the adjustable divider tips 222A, 222B, 222C, 222D.

In some exemplary embodiments, the controller 260 is further configured to detect the turn has ended and responsively activate one or more actuators 250A, 250B, 250C, 250D after the turn has ended. The controller 260 may detect the turn has ended by, for example, detecting the turn angle signal(s) has returned to a value indicating the turn has ended or, alternatively, no longer detecting the turn angle, indicating that the steerable wheel(s) 103 is no longer making a turn. After detecting the turn has ended, the controller 260 can activate one or more of the actuator(s) 250A, 250B, 250C, 250D to return the adjustable divider tips 222A, 222B, 222C, 222D to their respective predetermined operating orientations where the adjustable divider tips 222A, 222B, 222C, 222D are parallel to the travel axis TA and one another.

Referring now to FIGS. 3-6, an exemplary embodiment of an adjustable row divider 300 is illustrated that may be incorporated in the harvester 100. As can be seen, the row divider 300 includes multiple overlapping segments 301A, 301B, 301C that are displaceable relative to one another and may be coupled to a hood 610 (shown in FIG. 6) of the row divider 300. While the row divider 300 is shown with three segments 301A, 301B, 301C, it should be appreciated that the number of row divider segments may be two or more than three. In some exemplary embodiments, one or more of the segments 301A, 301B, 301C is coupled to an adjacent segment 301A, 301B, 301C by a respective flex joint 302A, 302B to allow the row divider 300 to bend from a straight operating orientation, illustrated as solid lines in FIG. 4, to a contoured turning orientation, illustrated in FIG. 4 as dashed lines.

Figure 5:
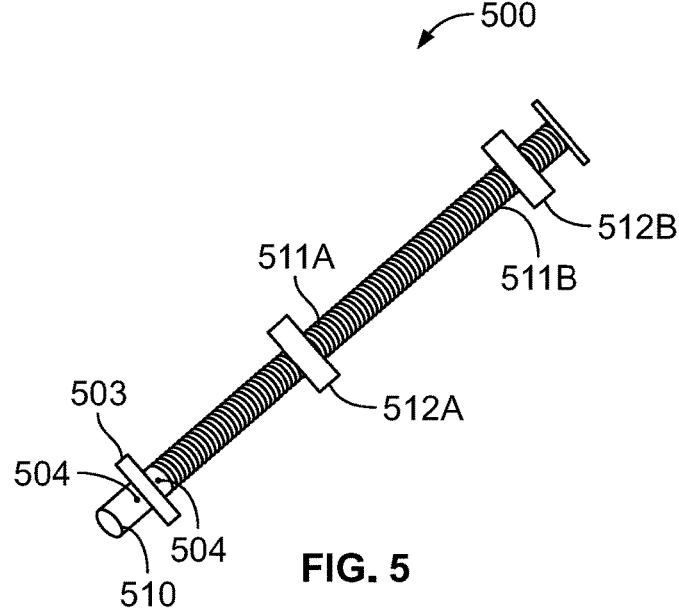
FIG. 5 is a perspective view of a cable screw incorporated in the row divider shown in FIG. 3.

To bend the row divider 300, and referring now to FIG. 5, the row divider 300 may include a cable screw 500 connected to the segments 301A, 301B, 301C. In some exemplary embodiments, the cable screw 500 includes a cable section 510 rotatably coupled to a drive shaft 600 (illustrated in FIG. 6) of the header 200 and one or more threaded sections 511A, 511B associated with a respective threaded block 512A, 512B. Each of the threaded blocks 512A, 512B may be coupled to a respective segment 301B, 301C so the coupled segments 301B, 301C tend to displace along the cable screw 500 as the threaded sections 511A, 511B rotate. To curve the row divider 300, the threaded sections 511A, 511B can have different threadings, e.g., pitch, from each other and/or the threaded blocks 512A, 512B can have different threadings from each other so rotation of the cable section 510 causes asymmetrical pulling on the coupled segments 301B, 301C by the respectively coupled threaded blocks 512A, 512B and the observed contouring of the row divider 300 shown in FIG. 4. For example, the threaded section 511A and its corresponding threaded block 512A may have a lower pitch than the threaded section 511B and its corresponding threaded block 512B so rotation of both threaded sections 511A, 511B causes the segment 301C, which is coupled to the threaded block 512B, to bend more than the segment 301B, which is coupled to the threaded block 512A. It should be appreciated that while the divider 300 is shown bending to the right in FIG. 4, the divider 300 can also be bent to the left by, for example, rotating the drive shaft 600 in the opposite direction.

Figure 3:
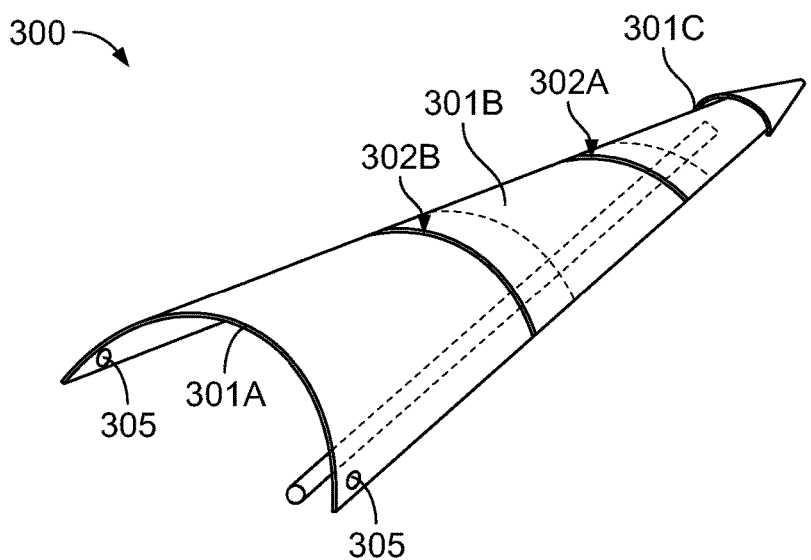
FIG. 3 is a perspective view of an exemplary embodiment of a row divider with an adjustable divider tip.
Figure 4:
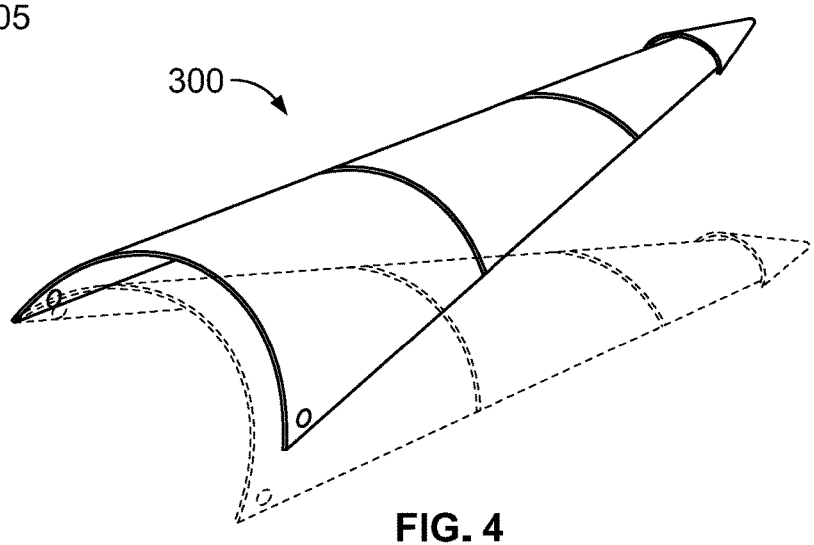
FIG. 4 is a perspective view of the row divider shown in FIG. 3 in a straight operating orientation and a contoured turning orientation.
Figure 6:
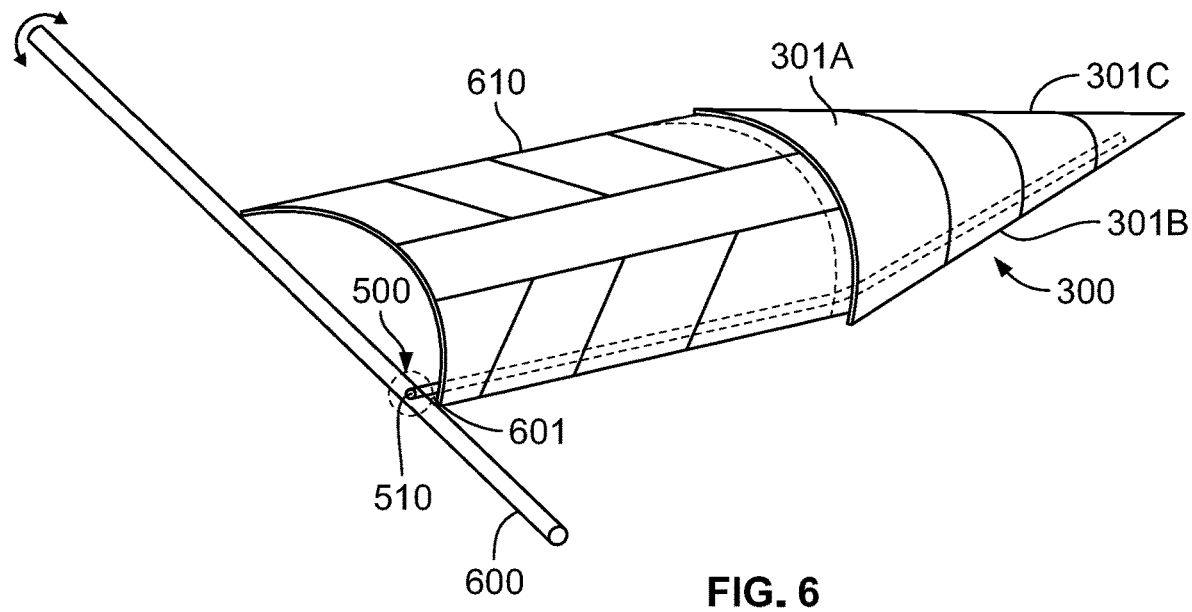
FIG. 6 is a perspective view of the row divider shown in FIGS. 3-5 connected to a hood.

In some exemplary embodiments, the cable screw 500 can also include an unthreaded retainer 503 the cable section 510 extends through to keep the cable section 510 in place during operation. The retainer 503 can couple to the segment 301A by, for example, inserting one or more retainer pins 504 through the retainer 503 and the segment 301A. As shown in FIGS. 3 and 6, the segment 301A can include a pair of vertical pivots 305 that pivotably couple the segment 301A to the hood 610, allowing the segments 301A, 301B, 301C to pivotably couple relative to the hood 610 for divider height adjustment.

In some exemplary embodiments, the header 200 includes multiple row dividers 300 that are each coupled to the drive shaft 600 by a direct connection between the drive shaft 600 and a respective cable screw, such as the cable screw 500 illustrated in FIG. 5. To allow different adjustment of the row dividers, the threaded sections and threaded blocks of each of the cable screws may be different so rotation of the drive shaft 600 causes different bending adjustments of each of the row dividers. Such a configuration allows each of the respective divider angles to be adjusted differently during a turn of the harvester 100 by using a single actuator to rotate the drive shaft 600.

In some exemplary embodiments, the cable section 510 does not directly couple to the drive shaft 600, but instead rotatably couples to a drive gear 601 (illustrated in dashed lines in FIG. 6) that rotates with the drive shaft 600. When multiple row dividers each have a respective cable screw rotatably coupled to a single drive shaft 600 by a respective drive gear, one or more of the drive gears can have a different diameter from one or more of the other drive screws so the respective divider angle of some or all row dividers adjust differently from other row dividers as the drive shaft 600 rotates.

Figure 7:
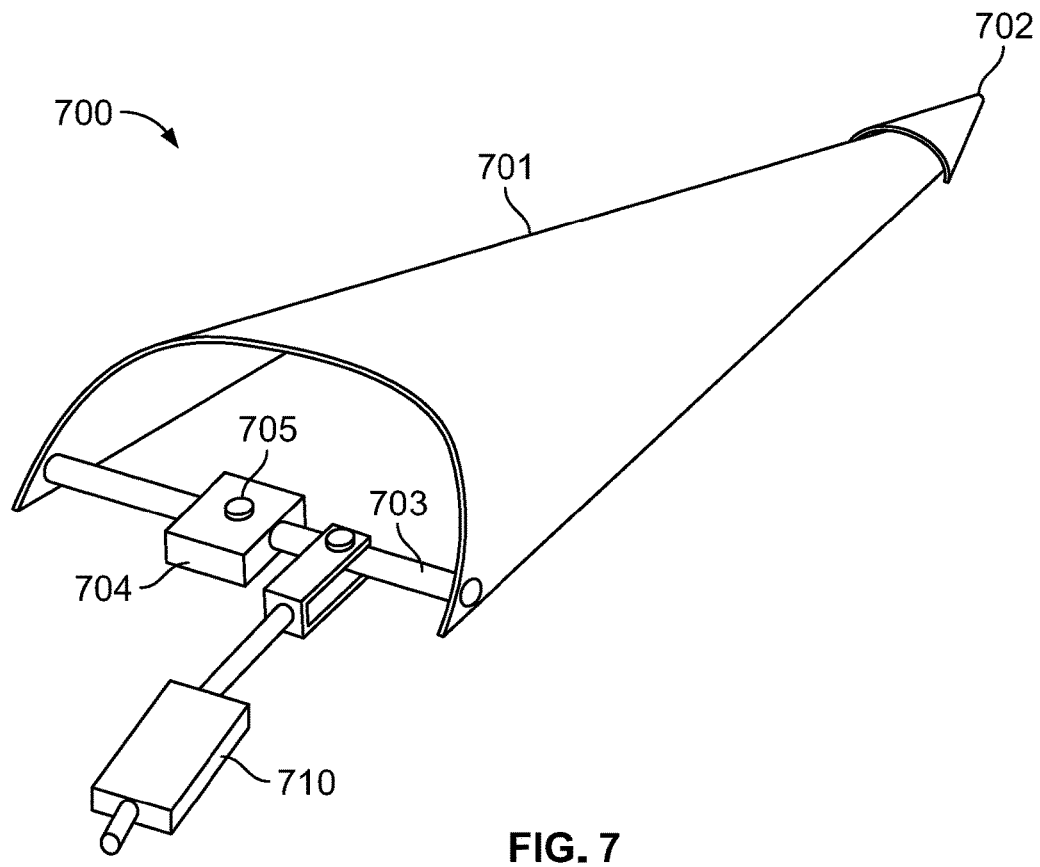
FIG. 7 is a perspective view of yet another exemplary embodiment of a row divider with an adjustable divider tip.

Referring now to FIG. 7, another exemplary embodiment of an adjustable row divider 700 is illustrated that includes a divider body 701 with an adjustable divider tip 702. To adjust the divider angle of the row divider 700, a divider actuator 710 can connect to a pivot rod 703 connected to the divider body 701 and also connected to a swiveled pivot 704. The swiveled pivot 704 can be connected to the divider body 701 as well and define a vertical pivot point 705 of the divider body 701 to allow horizontal pivoting of the divider body 701 to adjust the divider angle defined by the divider tip 702. Further, the swiveled pivot 704 can allow the divider body 701 to swivel vertically up and down to allow vertical adjustment of the row divider 700.

In some exemplary embodiments, the divider body 701 couples to a hood 800 having a first indented region 801 and a second indented region 802 adjacent to respective body coupling sites 803, 804 where the divider body 701 couples to the hood 800. By indenting the hood 800 in these regions 801, 802, the divider body 701 can freely pivot relative to the hood 800, rather than abutting against the hood 800 and experiencing impaired pivoting. In some exemplary embodiments, the vertical pivot point 704 extends through the hood 800 or extends through a flat extension (not shown) rather than through the hood 800.

Referring now to FIGS. 9-10, another exemplary embodiment of a row divider body 900 is shown that includes a plurality of segments 901A, 901B that are displaceable relative to one another. As shown in FIG. 9, the segments 901A, 901B can include a first segment 901A forming approximately half of the row divider body 900 and a second segment 901B forming approximately the other half of the row divider body 900. In some exemplary embodiments, the first segment 901A includes a track 902 and the second segment 901B includes a track follower 903, which may be a surface of the second segment 901B, placed in the track 902 to allow displacement of the second segment 901B relative to the first segment 901A, and vice versa. A first adjustment actuator 1010, which is shown in FIG. 10, can couple to the first segment 901A and a second adjustment actuator 1020 can couple to the second segment 901B, with activation of each adjustment actuator 1010, 1020 causing displacement of the respectively coupled segment 901A, 901B relative to the other segment 901B, 901A, as can be seen in FIG. 10. Such a configuration can allow a divider point 904 of the row divider body 900 to become less aggressive as the row divider body 900 contours. In some exemplary embodiments, the segments 901A, 901B displace relative to one another in a direction D that is parallel to the travel axis TA.

Figure 11:
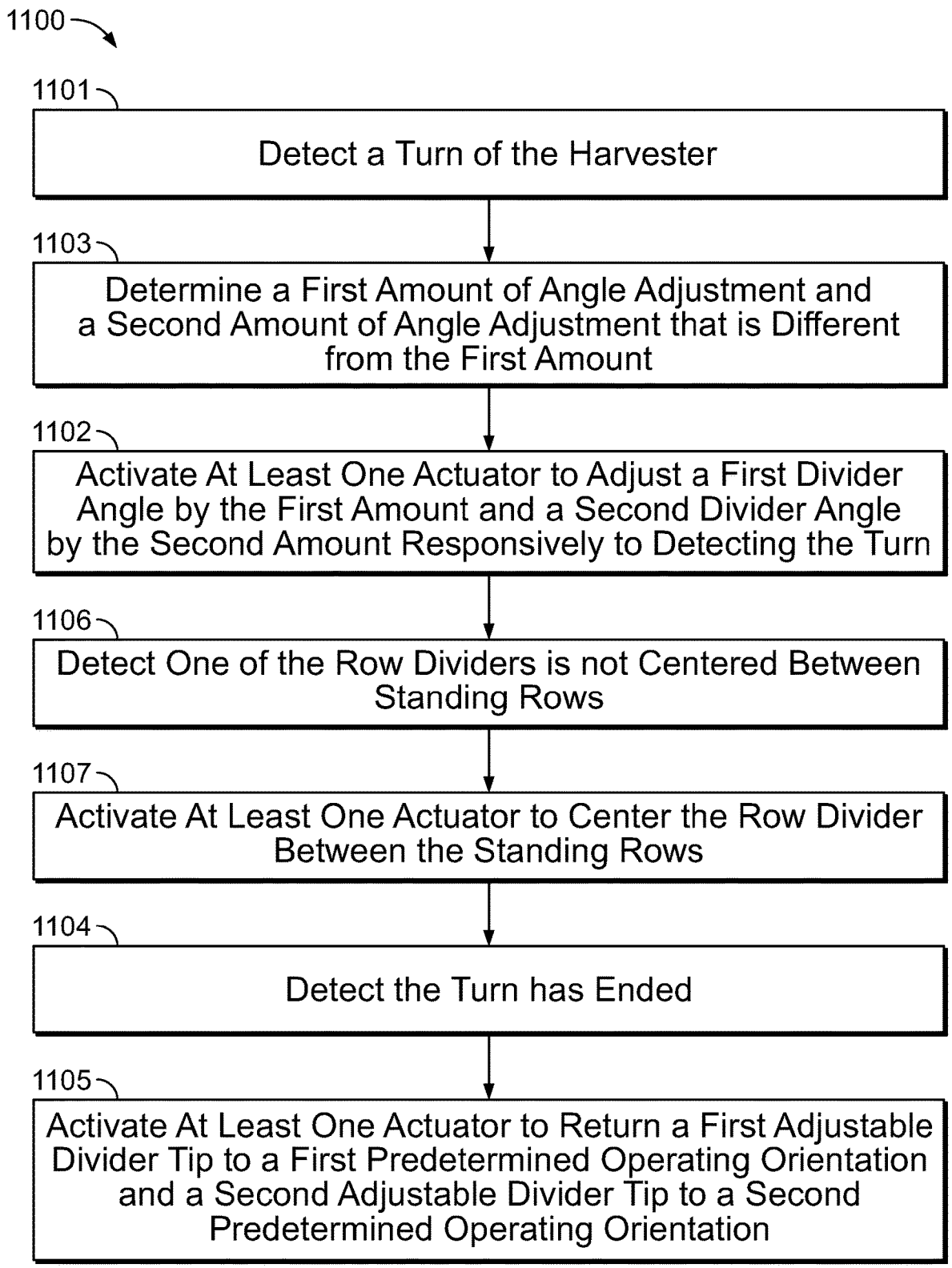
FIG. 11 is a flow chart illustrating an exemplary embodiment of a method for controlling row dividers of a harvester.

Referring now to FIG. 11, an exemplary embodiment of a method 1100 for adjusting row dividers of a harvester is illustrated. In describing the method 1100, reference is made to the previously described harvester 100 with row dividers 221A, 221B, 221C, 221D for ease of description, but it should be appreciated that the method 1100 is not limited to performance by harvester 100 and may be performed by other harvesters. The method 1100 includes detecting 1101, with the controller 260 or otherwise, a turn of the harvester 100. The detecting 1101 may include, for example, detecting a turn angle signal from the turn angle sensor 240 associated with the one or more steerable wheels 103. Responsively to detecting 1101 the turn, the controller 260 activates 1102 one or more actuators 250A, 250B, 250C, 250D to adjust the first divider angle Dα1 of the first row divider 221A by the first amount and adjust the second divider angle Dα2 of the second row divider 221B by the second amount, which is different than the first amount. In some exemplary embodiments, the controller 260 determines 1103 the first amount and second amount prior to activating 1102 one or more actuators 250A, 250B, 250C, 250D. The determining 1103 may include, for example, maintaining the first ratio of the turn angle Tα to the first amount and maintaining the second ratio of the turn angle Tα to the second amount, as previously described. In some exemplary embodiments, the first amount and second amount can be predetermined values.

The controller 260 may be further configured to detect 1104 the turn has ended, as previously described, and then responsively activate 1105 one or more of the actuators 250A, 250B, 250C, 250D to return the first row divider 221A to the first predetermined operating orientation and return the second row divider 221B to the second predetermined operating orientation. In some exemplary embodiments, the first adjustable divider tip 222A of the first row divider 221A and the second adjustable divider tip 222B of the second row divider 221B are parallel to one another and may also be parallel to the travel axis TA when the row dividers 221A, 221B are in their respective predetermined operating orientations. Optionally, the method 1100 may also include detecting 1106 one or more of the row dividers, such as the first row divider 221A, is not centered between adjacent standing rows SR1, SR2, as previously described. Upon detecting 1106 the row divider 221A is not centered between adjacent standing rows SR1, SR2, the controller 260 may activate 1107 one or more of the actuators 250A, 250B, 250C, 250D to center the row divider 221A between the adjacent standing rows SR1, SR2.

It is to be understood that the steps of the method 1100 can be performed by a controller, such as the controller 260, upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 260 described herein, such as the method 1100, is implemented in software code or instructions which are tangibly stored on a tangible computer readable medium. Upon loading and executing such software code or instructions by the controller 260, the controller 260 may perform any of the functionality of the controller 260 described herein, including any steps of the method 1100 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A harvester, comprising:
   a chassis defining a travel axis;
   at least one steerable wheel carried by the chassis;
   a turn angle sensor associated with the at least one steerable wheel and configured to output a turn angle signal;
   a header carried by the chassis, the header including:
      a header frame;
      a first row divider carried by the header frame and having a first adjustable divider tip, the first adjustable divider tip defining a first divider angle relative to the travel axis;
      a second row divider carried by the header frame and having a second adjustable divider tip, the second adjustable divider tip defining a second divider angle relative to the travel axis; and
      at least one divider actuator coupled to the first row divider and the second row divider and configured to adjust the first divider angle and the second divider angle; and
   a controller operatively coupled to the turn angle sensor and the at least one divider actuator, the controller being configured to:
      detect the at least one steerable wheel is making a turn;
      activate the at least one actuator to adjust the first divider angle by a first amount responsively to the detecting the turn;
      activate the at least one actuator to adjust the second divider angle by a second amount that is different from the first amount responsively to the detecting the turn;
      detect the turn has ended;
      activate the at least one actuator to adjust the first adjustable divider tip to a first predetermined operating orientation after the turn has ended; and
      activate the at least one actuator to adjust the second adjustable divider tip to a second predetermined operating orientation after the turn has ended, the first adjustable divider tip and the second adjustable divider tip being parallel to one another when the first adjustable divider tip is in the first predetermined operating orientation and the second adjustable divider tip is in the second predetermined operating orientation.

2. The harvester of claim 1, wherein the header frame defines a reference point, the first adjustable divider tip defines a first distance from the reference point, the second adjustable divider tip defines a second distance from the reference point that is less than the first distance, and the second amount is less than the first amount.

3. The harvester of claim 2, wherein the controller is further configured to:
   maintain a first ratio between a turn angle of the turn and the first amount; and
   maintain a second ratio between the turn angle and the second amount.

4. The harvester of claim 1, wherein the at least one divider actuator comprises a first divider actuator coupled to the first row divider and a second divider actuator coupled to the second row divider.

5. The harvester of claim 4, wherein the controller is configured to activate the first divider actuator simultaneously with activating the second divider actuator.

6. The harvester of claim 1, wherein at least one of the first row divider and the second row divider comprises a plurality of segments that are displaceable relative to one another.

7. The harvester of claim 6, wherein at least two of the plurality of segments overlap one another.

8. The harvester of claim 6, wherein at least two of the plurality of segments are displaceable relative to one another in a direction parallel to the travel axis.

9. The harvester of claim 1, wherein the first adjustable divider tip is parallel to the travel axis in the first predetermined operating orientation and the second adjustable divider tip is parallel to the travel axis in the second predetermined operating orientation.

10. The harvester of claim 1, further comprising at least one distance sensor associated with the first row divider and operatively coupled to the controller.

11. The harvester of claim 10, wherein the controller is further configured to:
    determine the first row divider is not centered between a first crop row and a second crop row; and
    adjust the first divider angle until the first row divider is centered between the first crop row and the second crop row.

12. A method for adjusting a first row divider and a second row divider of a harvester, the first row divider having a first adjustable divider tip defining a first divider angle relative to a travel axis of the harvester and the second row divider having a second adjustable divider tip defining a second divider angle relative to the travel axis, the method comprising:
    detecting a turn of the harvester;
    activating at least one actuator to adjust the first divider angle by a first amount and the second divider angle by a second amount that is different from the first amount responsively to the detecting the turn;
    detecting the turn has ended;
    activating at least one actuator to return the first adjustable divider tip to a first predetermined operating orientation; and
    activating at least one actuator to return the second adjustable divider tip to a second predetermined operating orientation.

13. The method of claim 12, further comprising determining the first amount and the second amount, the determining comprising:
    maintaining a first ratio of a turn angle of the turn to the first amount; and
    maintaining a second ratio of the turn angle to the second amount.

14. The method of claim 12, wherein the first adjustable divider tip is parallel to the second adjustable divider tip when the first adjustable divider tip is in the first predetermined operating orientation and the second adjustable divider tip is in the second predetermined operating orientation.

15. The method of claim 14, wherein the first adjustable divider tip is parallel to the travel axis in the first predetermined operating orientation.

16. The method of claim 12, further comprising detecting the first row divider is not centered between two adjacent standing rows.

17. The method of claim 16, further comprising activating at least one actuator to center the first row divider between the two adjacent standing rows.

* * * * *